(12) United States Patent
Lu et al.

(10) Patent No.: US 8,294,439 B2
(45) Date of Patent: Oct. 23, 2012

(54) BUCK-BOOST SWITCHING REGULATOR AND CONTROL CIRCUIT AND METHOD THEREFOR

(75) Inventors: Chien-Ping Lu, Tainan (TW); Kwan-Jen Chu, Hsinchu (TW); Tzu-Huan Chiu, Zhubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 425 days.

(21) Appl. No.: 12/799,107

(22) Filed: Apr. 19, 2010

(65) Prior Publication Data

US 2011/0001461 A1 Jan. 6, 2011

(30) Foreign Application Priority Data

Jul. 1, 2009 (TW) .................................. 98122330 A

(51) Int. Cl.
*G05F 1/618* (2006.01)
(52) U.S. Cl. ............................ 323/271; 363/17; 323/224
(58) Field of Classification Search .................. 323/222, 323/224, 225, 266, 271, 259, 282–286; 363/16–17, 363/53, 49, 65, 97–98, 132
See application file for complete search history.

(56) References Cited

U.S. PATENT DOCUMENTS

| 5,402,060 A | * | 3/1995 | Erisman ..................... 323/268 |
| 6,166,527 A | | 12/2000 | Dwelley et al. |
| 6,930,898 B2 | * | 8/2005 | Jeon et al. ..................... 363/98 |
| 7,176,667 B2 | | 2/2007 | Chen et al. |
| 7,248,030 B2 | * | 7/2007 | Yoshino ....................... 323/284 |
| 7,391,190 B1 | * | 6/2008 | Rajagopalan ................ 323/271 |

\* cited by examiner

*Primary Examiner* — Rajnikant Patel
(74) *Attorney, Agent, or Firm* — Tung & Associates

(57) ABSTRACT

The present invention discloses a buck-boost switching regulator, and a control circuit and a method therefor, to convert an input voltage to an output voltage. The control method comprises: obtaining a feedback signal relating to the output voltage; comparing the feedback signal with a reference voltage to generate an error amplified signal; when the error amplified signal is between a first voltage (V1) and a second voltage (V2), causing the switching regulator to operate in a buck conversion mode; when the error amplified signal is between a third voltage (V3) and a fourth voltage (V4), causing the switching regulator to operate in a boost conversion mode; and when the error amplified signal is between the second voltage and the third voltage, causing the switching regulator to operate in a buck-boost conversion mode in which each power switch operates according to a respective predetermined pulse width, wherein V1<V2<V3<V4.

16 Claims, 12 Drawing Sheets

US 8,294,439 B2

BUCK-BOOST SWITCHING REGULATOR AND CONTROL CIRCUIT AND METHOD THEREFOR

BACKGROUND OF THE INVENTION

1. Field of Invention

The present invention relates to a buck-boost switching regulator and a control circuit and a method for controlling the buck-boost switching regulator.

2. Description of Related Art

Referring to FIG. 1, U.S. Pat. No. 6,166,527 discloses a method for controlling a buck-boost switching regulator. The buck-boost switching regulator comprises an inductor L, four power switches A, B, C and D, and a control circuit 20. The control circuit 20 controls the switching operations of the four power switches A, B, C and D to convert an input voltage Vin to an output voltage Vout. The input voltage Vin may be higher or lower than the output voltage Vout, and therefore the regulator may need to perform buck or boost conversion. In the control circuit 20, an error amplifier 22 compares a feedback signal FB (indicating information relating to the output voltage Vout) with a reference voltage Vref, and generates an error amplified signal Vea. PWM comparators 27 and 28 compare the error amplified signal Vea with voltage wave signals VX and VY respectively, and a logic circuit 29 generates switching control signals VA, VB, VC, and VD to control the corresponding power switches A, B, C, and D according to the outputs from the PWM comparators 27 and 28.

The relationships among the error amplified signal Vea, the voltage wave signals VX and VY, and the switching control signals VA, VB, VC and VD are shown in FIG. 2. When the error amplified signal Vea is between V1 and V2, the regulator operates in a buck conversion mode. When the error amplified signal Vea is between V2 and V3, the regulator operates in a buck-boost conversion mode. When the error amplified signal Vea is between V3 and V4, the regulator operates in a boost conversion mode. When the regulator is operating in the buck conversion mode, the power switch C is kept off and the power switch D is kept on. When the regulator is operating in the boost conversion mode, the power switch A is kept on and the power switch B is kept off. When the regulator is operating in the buck-boost conversion mode, as shown in the FIG. 2, the switching control signals VA and VB are generated according to the relationship between the error amplified signal Vea and the voltage wave signal VX, and the switching control signals VC and VD are generated according to the relationship between the error amplified signal Vea and the voltage wave signal VY. In other words, the regulator is operating in mixed operations including both boost conversion (the power switches C and D operating) and buck conversion (the power switches A and B operating).

The aforementioned prior art has a feature that all the power switches A, B, C and D operate according to the feedback signal FB all the time. The drawback of this kind of arrangement is shown in FIG. 2. When the error amplified signal Vea intersects with the voltage wave signal VX by a very small period, the switching control signals VA and VB are still generated to turn on/off the power switches A and B. This causes switching loss and increases the power consumption. The same condition occurs when the error amplified signal Vea intersects with the voltage wave signal VY by a very small period.

FIG. 3 shows a structure of another prior art U.S. Pat. No. 7,176,667. The prior art uses the error amplifier 22 to generate two error amplified signals Vea1 and Vea2, one of which is chosen to be compared with a voltage wave OSC in the PWM comparators 27. In addition, a fixed pulse width signal generation circuit 25 is provided, and the logic circuit 29 generates the switching control signals VA, VB, VC and VD to control the power switches A, B, C and D respectively according to the outputs from the PWM comparator 27 and the fixed pulse width signal generation circuit 25.

Referring to FIG. 4, U.S. Pat. No. 7,176,667 includes four conversion modes: besides the buck conversion mode M1 and the boost conversion mode M4, a transient buck conversion mode M2 and a transient boost conversion mode M3 are provided between M1 and M4. In the transient buck conversion mode M2, the switching control signals VA and VB follow the output of the PWM comparator 27 and the switching control signals VC and VD have fixed pulse widths. In the transient boost conversion mode M3, the switching control signals VC and VD follow the output of the PWM comparator 27 and the switching control signals VA and VB have fixed pulse widths.

The aforementioned prior art has the drawbacks that a more complicated control mechanism is required for four conversion modes, and that an additional fixed pulse width signal generation circuit 25 and other circuit devices are required. Furthermore, two transient conversion modes (M2 and M3) increase opportunities for the circuit to operate therein, wherein all the four power switches are operating, increasing the switching loss and the power consumption.

In view of the above drawbacks, it is desired to provide a buck-boost switching regulator and a control circuit and a method for controlling the buck-boost switching regulator, that can decrease the switching loss and the power consumption and enhance the power conversion efficiency of the regulator.

SUMMARY OF THE INVENTION

The first objective of the present invention is to provide a buck-boost switching regulator.

The second objective of the present invention is to provide a control circuit for controlling the buck-boost switching regulator.

The third objective of the present invention is to provide a method for controlling the buck-boost switching regulator.

To achieve the objectives mentioned above, from one perspective, the present invention provides a buck-boost switching regulator comprising: an inductor having a first terminal and a second terminal; a first power switch having one terminal coupled to the first terminal of the inductor and another terminal coupled to an input voltage; a second power switch having one terminal coupled to the first terminal of the inductor and another terminal coupled to ground; a third power switch having one terminal coupled to the second terminal of the inductor and another terminal coupled to ground; a fourth power switch having one terminal coupled to the second terminal of the inductor and another terminal coupled to an output voltage; and a control circuit controlling the operation of the four power switches such that: (1) when the switching regulator is operating in a buck conversion mode, the first and the second power switches operate and the third and the fourth power switches do not operate; (2) when the switching regulator is operating in a boost conversion mode, the third and the fourth power switches operate and the first and the second power switches do not operate; and (3) when the switching regulator is operating in a buck-boost conversion mode, the first and the second power switches operate according to a predetermined first pulse width and the third and the fourth power switches operate according to a predetermined second pulse width.

The second or the fourth power switch can be replaced by a diode in the buck-boost switching regulator mentioned above.

In one embodiment, the control circuit of the switching regulator includes: an error amplifier for comparing a feedback signal relating to the output voltage with a reference voltage; a first wave generator for generating a first wave, which at least includes, in one cycle: a ramp segment between a first voltage (V1) and a second voltage (V2), a flat segment kept at a third voltage (V3) for a period of time, and two vertical segments at two ends of the flat segment; a second wave generator for generating a second wave, which at least includes, in one cycle: a flat segment kept at the second voltage (V2) for a period of time, a ramp segment between the third voltage (V3) and a fourth voltage (V4), and two vertical segments at the two ends of the flat segment, wherein V1<V2<V3<V4; a first and a second PWM comparators for comparing the output of the error amplifier with the first wave and the second wave respectively; and a logic circuit for generating a control signal according to outputs of the first and the second PWM comparators to control the first, the second, the third, and the fourth power switches.

From another perspective, the present invention provides a control circuit for controlling a buck-boost switching regulator to convert an input voltage to an output voltage, the control circuit comprising: an error amplifier for comparing a feedback signal relating to the output voltage with a reference voltage; a first wave generator for generating a first wave, which at least includes, in one cycle: a ramp segment between a first voltage (V1) and a second voltage (V2), a flat segment kept at a third voltage (V3) for a period of time, and two vertical segments at the two ends of the flat segment; a second wave generator for generating a second wave, which at least includes, in one cycle: a flat segment kept at the second voltage (V2) for a period of time, a ramp segment between the third voltage (V3) and a fourth voltage (V4), and two vertical segments at the two ends of the flat segment, wherein V1<V2<V3<V4; a first and a second PWM comparators for comparing the output of the error amplifier with the first wave and the second wave respectively; and a logic circuit for generating a control signal according to outputs of the first and the second PWM comparators.

From another perspective, the present invention provides a control method for controlling a buck-boost switching regulator, wherein the switching regulator includes three power switches and a diode, or four power switches, and it converts an input voltage to an output voltage by switching operations of the power switches, the control method comprising: obtaining a feedback signal relating to an output voltage; comparing the feedback signal with a reference voltage to generate an error amplified signal; when the error amplified signal is between a first voltage (V1) and a second voltage (V2), causing the buck-boost switching regulator to operate in a buck conversion mode; when the error amplified signal is between a third voltage (V3) and a fourth voltage (V4), causing the buck-boost switching regulator to operate in a boost conversion mode; and when the error amplified signal is between the second voltage and the third voltage, causing the buck-boost switching regulator to operate in a buck-boost conversion mode in which each power switch operates according to a respective predetermined pulse width, wherein V1<V2<V3<V4.

In the aforementioned buck-boost switching regulator and the control circuit for controlling the buck-boost switching regulator, it is preferred that (V3−V2)<(V4−V3) and (V3−V2)<(V2−V1).

The objectives, technical details, features, and effects of the present invention will be better understood with regard to the detailed description of the embodiments below.

DESCRIPTION OF THE PREFERRED EMBODIMENTS

Figure 1:
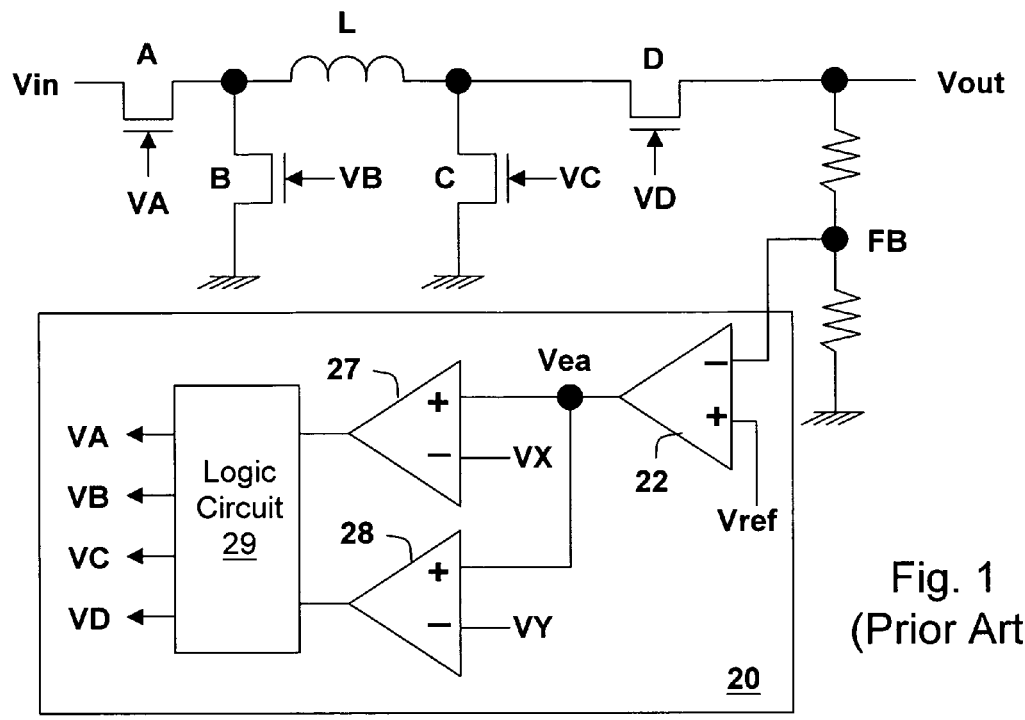
FIG. 1 shows a prior art buck-boost switching regulator.
Figure 2:
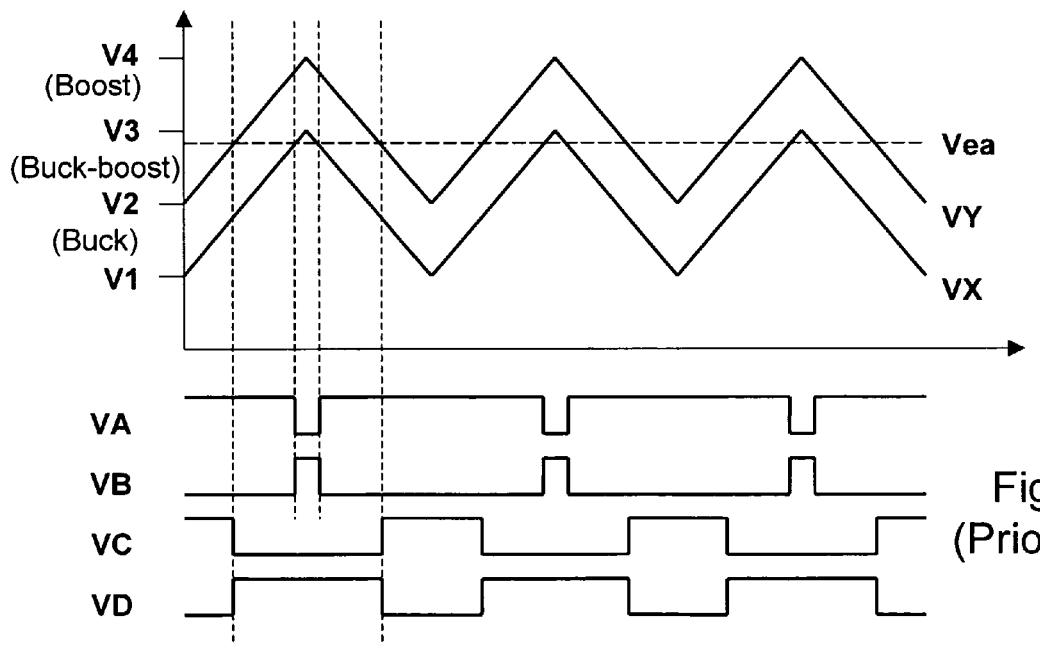
FIG. 2 shows the waveforms corresponding to the circuit of FIG. 1.
Figure 3:
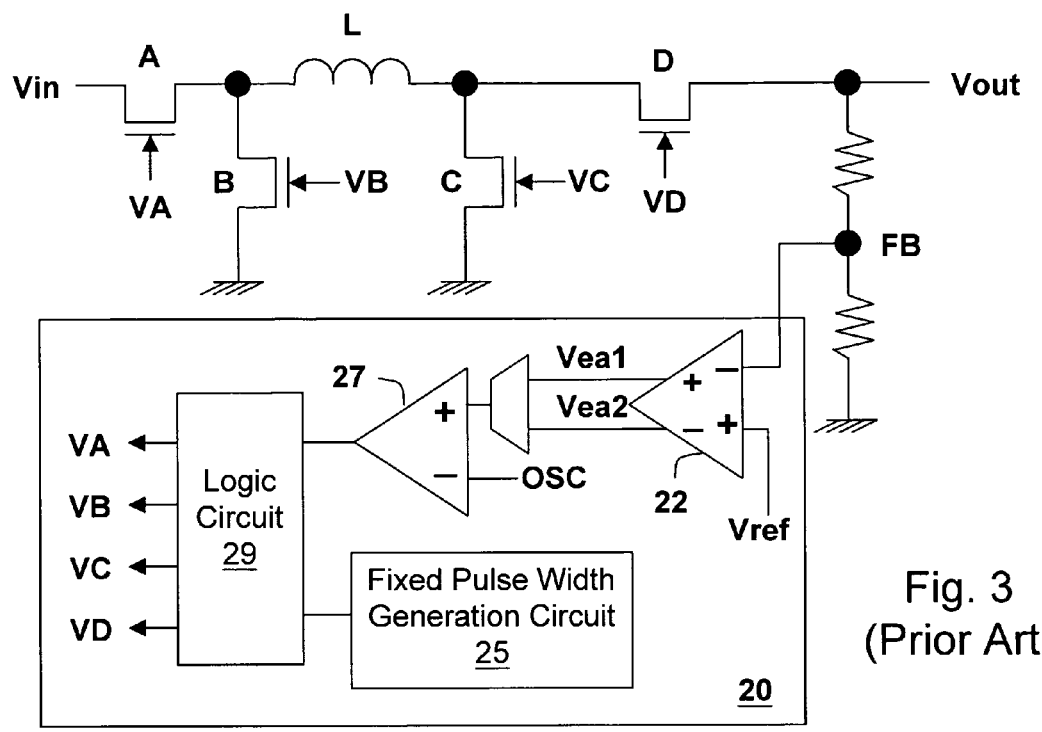
FIG. 3 shows another prior art buck-boost switching regulator.
Figure 4:
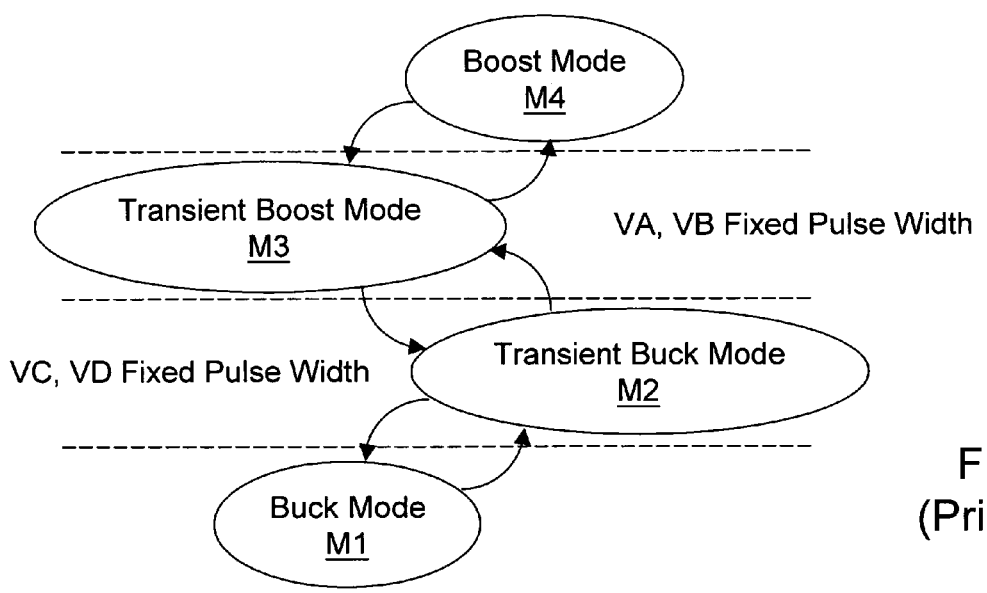
FIG. 4 shows a state machine corresponding to the circuit of FIG. 3.
Figure 5:
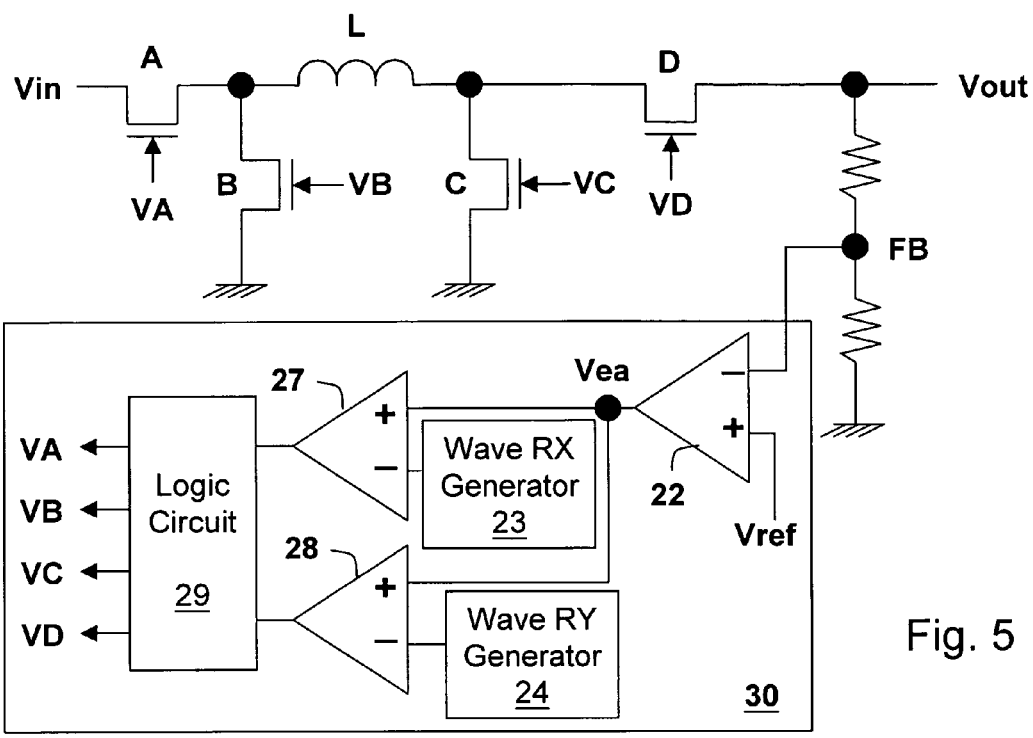
FIG. 5 shows an embodiment of the buck-boost switching regulator according to the present invention.

FIG. 5 shows a first embodiment of the present invention. As shown in the figure, a buck-boost switching regulator comprises an inductor L, four power switches A, B, C and D, and a control circuit 30. The control circuit 30 controls the switching operations of the four power switches A, B, C and D to convert an input voltage Vin to an output voltage Vout. In the control circuit 30, an error amplifier 22 generates an error amplified signal Vea by comparing a feedback signal FB (indicating information relating to the output voltage Vout) with a reference voltage Vref. A waveform RX generator 23 and a waveform RY generator 24 generate a waveform RX and a waveform RY respectively. The PWM comparators 27 and 28 compare the error amplified signal Vea respectively with the waveform RX and the waveform RY. A logic circuit 29 generates the switching control signals VA, VB, VC and VD to control the corresponding power switches A, B, C and D according to the comparison results of the PWM comparators 27 and 28.

Figure 6:
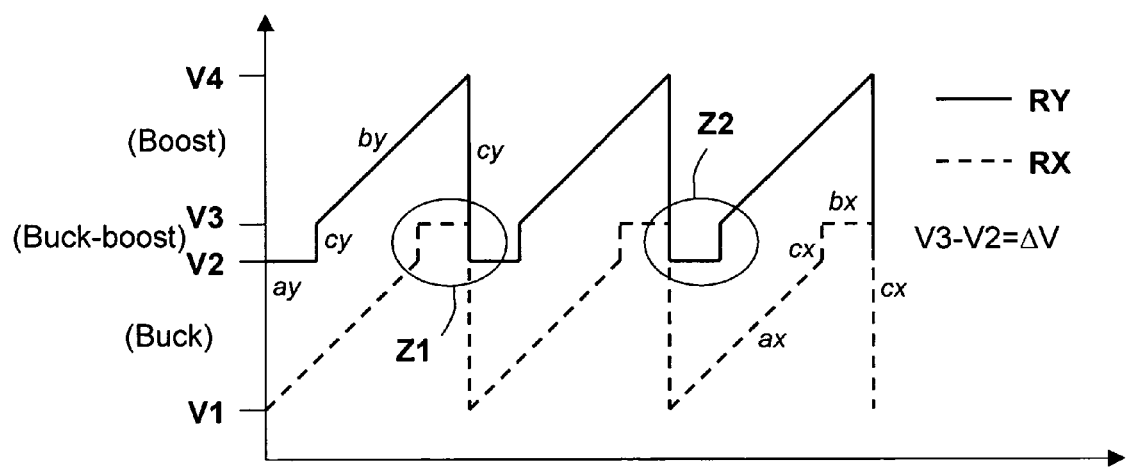
FIG. 6 and FIG. 7 show the functions of the waveforms RX and RY.

Referring to FIG. 6, one feature of the present invention is the waveforms RX and RY generated by the waveform RX generator 23 and 24. The waveforms RX and RY are not a simple triangle wave or sawtooth wave. As shown in FIG. 6, the waveform RX and the waveform RY have specially designed zones Z1 and Z2, respectively. More specifically, in each cycle, the waveform RX rises up from V1 until V2, then jumps to and maintains at V3, and then returns to V1 at the end of the cycle. The waveform RY starts from and maintains at V2 for a period of time, then jumps to V3 and starts to rise until V4. In other words, the waveform RX at least includes, in one cycle: a ramp segment ax between V1 and V2, a flat segment bx kept at V3 for a period of time, and two vertical segments cx at two ends of the flat segment bx; and the waveform RY at least includes, in one cycle: a flat segment ay kept at V2 for a period of time, a ramp segment by between V3 and V4, and two vertical segments cy at the two ends of the flat segment ay, wherein V1<V2<V3<V4. In addition to the aforementioned feature, according to the present invention, the difference ΔV between V2 and V3 is preferably set as small as possible. That is, preferably, (V3−V2)<(V4−V3) and (V3−V2)<(V2−V1).

Figure 7:
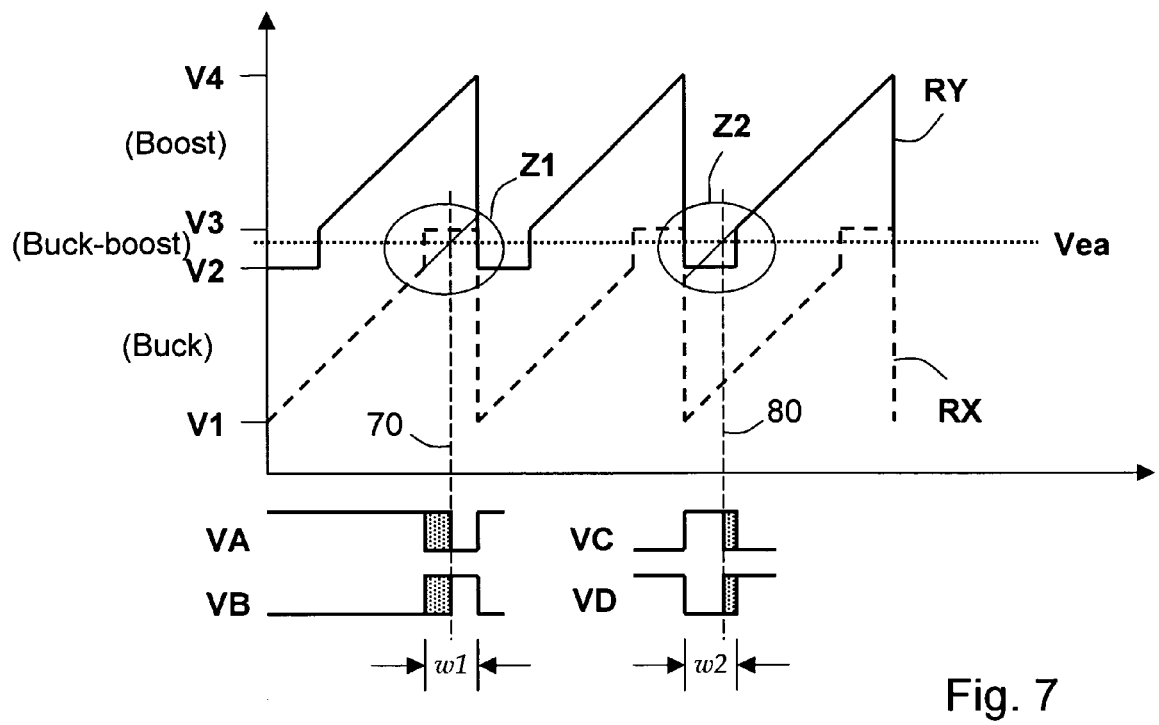

The functions of the aforementioned zones Z1 and Z2 and the reason why the difference ΔV is preferably set as small as possible are described below. Referring to FIG. 7, when the error amplified signal Vea is between V1 and V2, the regulator operates in a buck conversion mode. When the error amplified signal Vea is between V2 and V3, the regulator operates in a buck-boost conversion mode. When the error amplified signal Vea is between V3 and V4, the regulator operates in a boost conversion mode. As shown in FIG. 7, when the error amplified signal Vea is between V2 and V3, referring particularly to the zone Z1, if the waveform RX is a simple triangle wave or sawtooth wave, the error amplified signal Vea will intersect with the sawtooth wave on the line 70, and the falling edge of the switching control signal VA and the rising edge of the switching control signal VB will be also on the line 70. Thus, even though the error amplified signal Vea intersects with the sawtooth wave by only a very small period, the switching control signals VA and VB still control the power switches A and B to switch, causing switching loss. Similarly, referring particularly to the zone Z2 and the line 80, if the waveform RY is a simple triangle wave or sawtooth wave, when the error amplified signal Vea intersects with the waveform RY by only a very small period, the switching control signals VC and VD still control the power switches C and D to switch, causing switching loss. However, according to the present invention, the waveforms RX and RY are not a simple triangle wave or sawtooth wave, so the very small intersection does not occur. The minimum off-time of the switching control signal VA and the minimum on-time of the switching control signal VB are ω1; the minimum on-time of the switching control signal VC and the minimum off-time of the switching control signal VD are ω2, wherein ω1 and ω2 can be equal or not equal to each other. In other words, when the error amplified signal Vea is located in the zones Z1 and Z2, no matter what the level of the error amplified signal Vea is, all the power switches of the regulator operate with a predetermined minimum pulse width, such that the switching loss caused by minor switching operations of the power switches can be avoided. This also means that when the regulator operates in the buck-boost conversion mode, the operations of the power switches A, B, C and D are not related to the level of the output voltage Vout or the feedback signal FB, i.e., no feedback adjustment for the output voltage. Thus, it is not preferred for the regulator to operate in the buck-boost conversion mode frequently or stay therein for too long. According to the present invention, the difference ΔV between V2 and V3 is preferably far smaller than the difference in the U.S. Pat. No. 6,166,527, so that the regulator of the present invention is seldom operating in the buck-boost conversion mode, and even if it enters the buck-boost conversion mode, it will not stay therein for too long (details will be depicted referring to FIG. 10).

Figure 8:
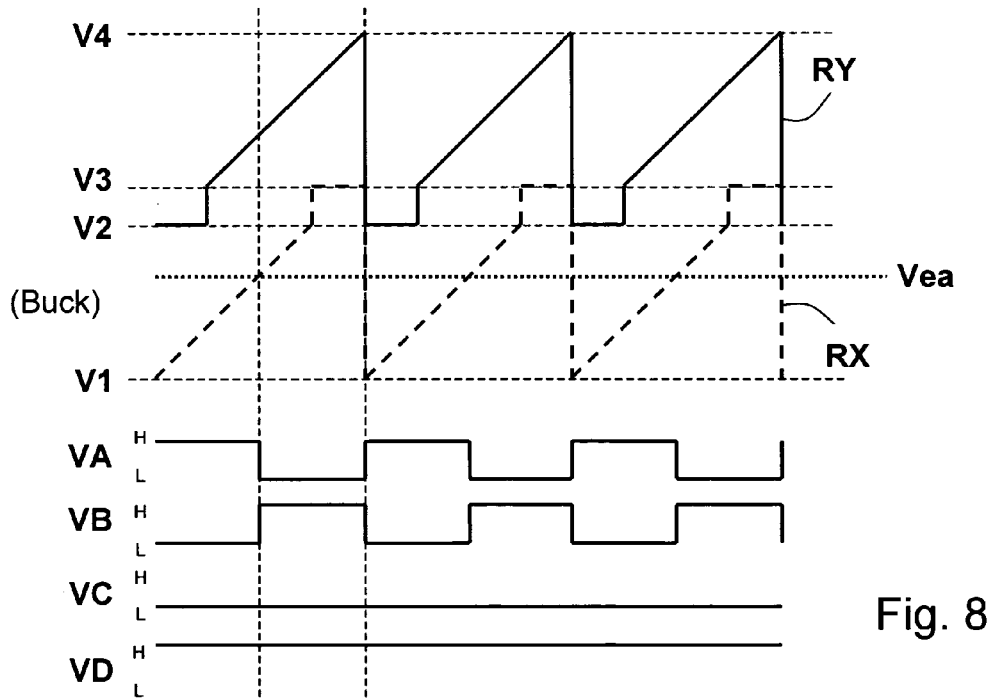
FIG. 8 to FIG. 10 respectively show the operations of the present invention in the buck conversion mode, the boost conversion mode, and the buck-boost conversion mode.
Figure 9:
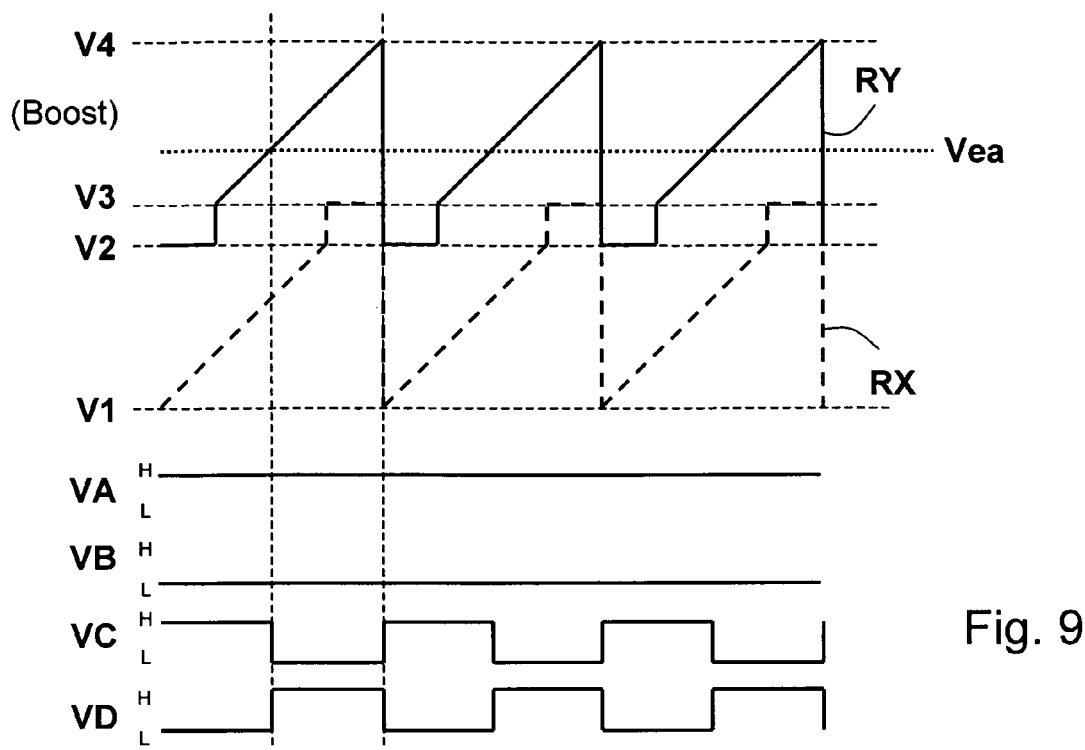

FIG. 8 shows the condition wherein the error amplified signal Vea is between V1 and V2. Under such condition, the regulator is operating in the buck conversion mode, and the power switch C is kept off and the power switch D is kept on. The control circuit 30 generates the switching control signals VA and VB according to the feedback signal FB, to feedback control the power switches A and B. FIG. 9 shows the condition wherein the error amplified signal Vea is between V3 and V4. Under such condition, the regulator is operating in the boost conversion mode, and the power switch A is kept on and the power switch B is kept off. The control circuit 30 generates the switching control signals VC and VD according to the feedback signal FB, to feedback control the power switches C and D.

Figure 10:
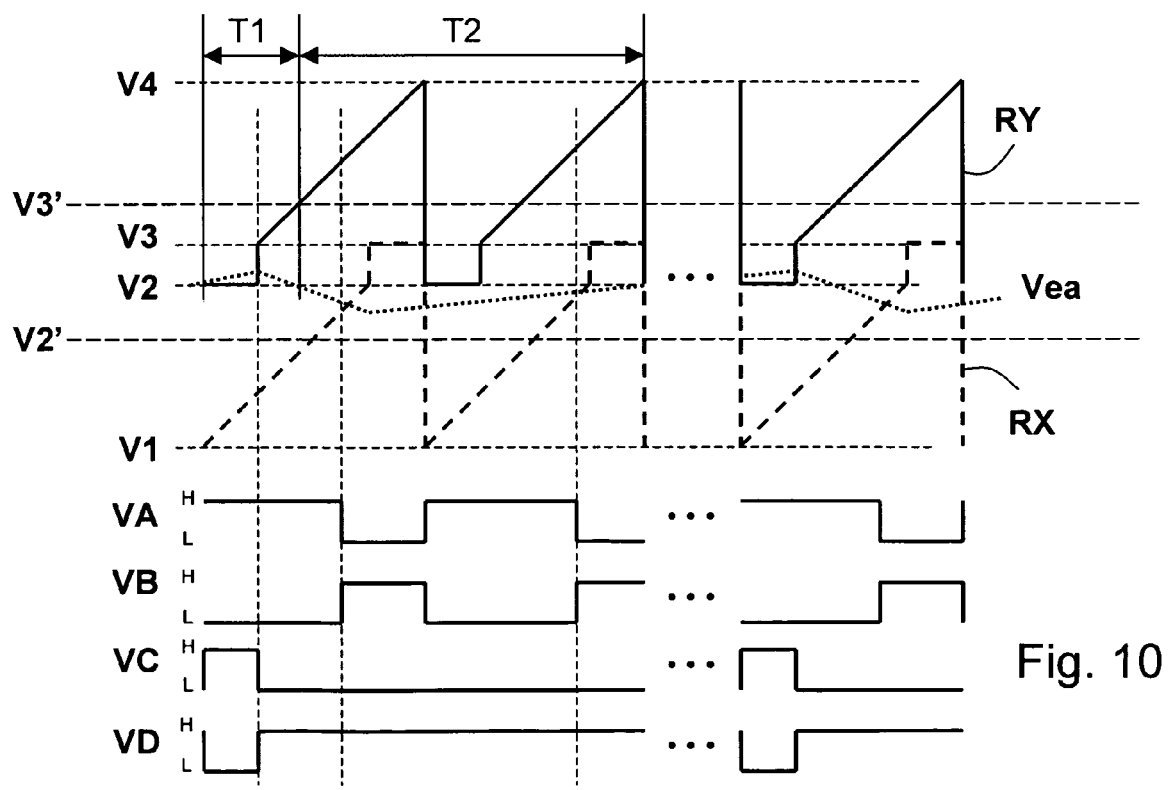

Referring to FIG. 10, because the margin between V2 and V3 is not large, and all the power switches A, B, C and D are operating with the predetermined minimum pulse width when the regulator is operating in the buck-boost conversion mode, once the regulator enters the buck-boost conversion mode, the regulator will immediately leave the mode and change to the boost conversion mode or the buck conversion mode. For example, as shown in FIG. 10, the regulator is operating in the buck conversion mode at first. But when the level of the error amplified signal Vea increases due to the decrease of the input voltage Vin or other reasons, the regulator enters the buck-boost conversion mode (period T1). At this moment, because all the power switches A, B, C and D are operating with the predetermined minimum pulse width, providing more power to the output voltage Vout than it needs, the error amplified signal Vea decreases rapidly, such that the regulator returns to the buck conversion mode (period T2) immediately. V2' and V3' in the figure are imaginary lines corresponding to V2 and V3 of U.S. Pat. No. 6,166,527. The operations in FIG. 10 of the present invention can be compared with the operations of the buck-boost conversion mode in U.S. Pat. No. 6,166,527. In the embodiment shown in FIG. 10, the periods T1 and T2 in combination cover two cycles, but the power switches C and D only switch once, thus providing a pulse-skipping effect to reduce the switching loss and improve the power conversion efficiency (in a real condition, periods T1 and T2 in combination may cover more number of cycles, and thus the pulse-skipping effect will be more significant).

The waveforms RX and RY can be generated in many ways. Several embodiments will be disclosed in the following description, but the present invention is not limited to any of the embodiments. Those skilled in this art can readily conceive variations and modifications within the spirit of the present invention.

Figure 11A:
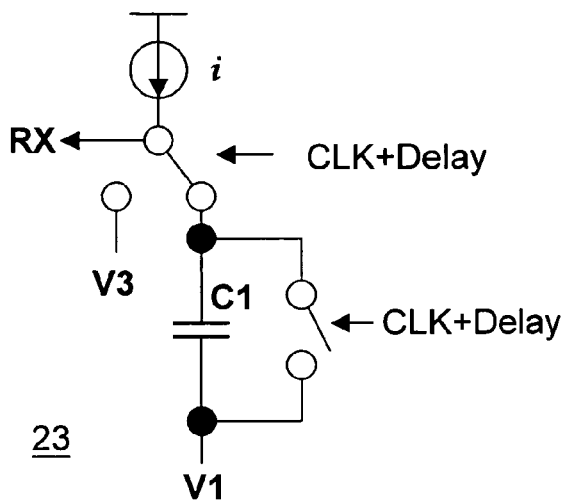
FIG. 11A to FIG. 11C show an embodiment of the waveform RX generator 23.
Figure 11A:
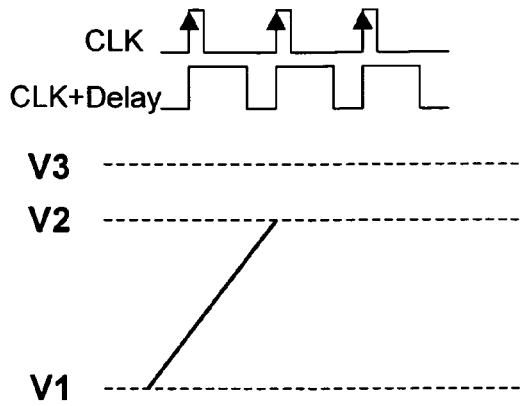
Figure 11B:
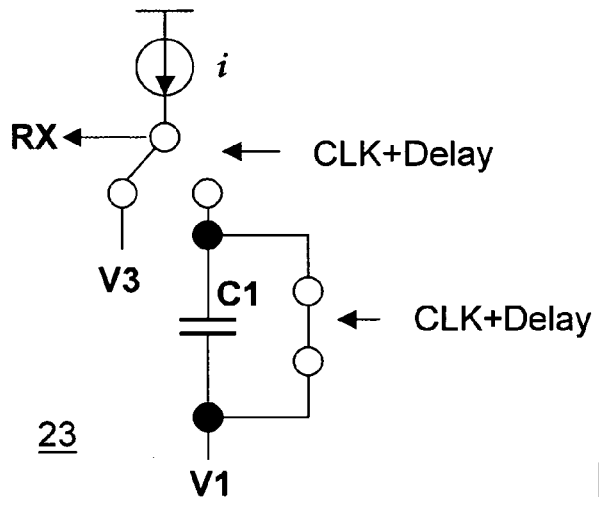
Figure 11B:
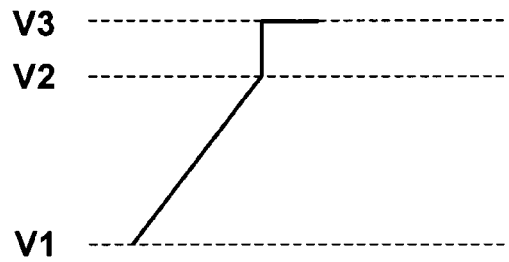
Figure 11C:
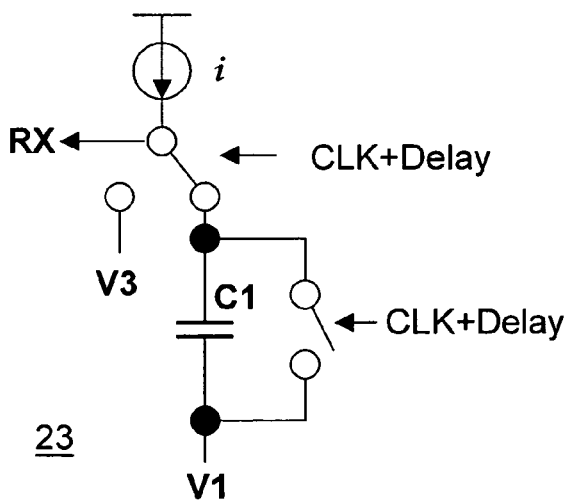
Figure 11C:
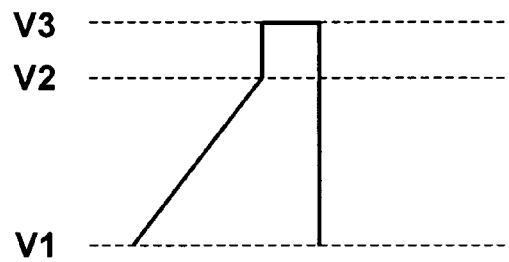

FIG. 11A to FIG. 11C show an embodiment of the waveform RX generator 23. The cycle of the waveform RX is determined by the clock signal CLK. The regulator generates a delay signal (CLK+Delay) according to the clock signal CLK. The rising edge of the delay signal is synchronous with the clock signal CLK, but the falling edge is delayed in comparison with the falling edge of the clock signal CLK. According to the delay signal (CLK+Delay), a current i charges a capacitor C1 in the beginning of a cycle such that a first segment of the waveform is formed as shown in FIG. 11A. At the falling edge of the delay signal, the node RX switches to voltage V3, and the capacitor C1 discharges, such that a second segment of the waveform is formed as shown in FIG. 11B. At last, at the end of the cycle, a next cycle begins, and a third segment of the waveform is formed as shown in FIG. 11C.

Figure 12A:
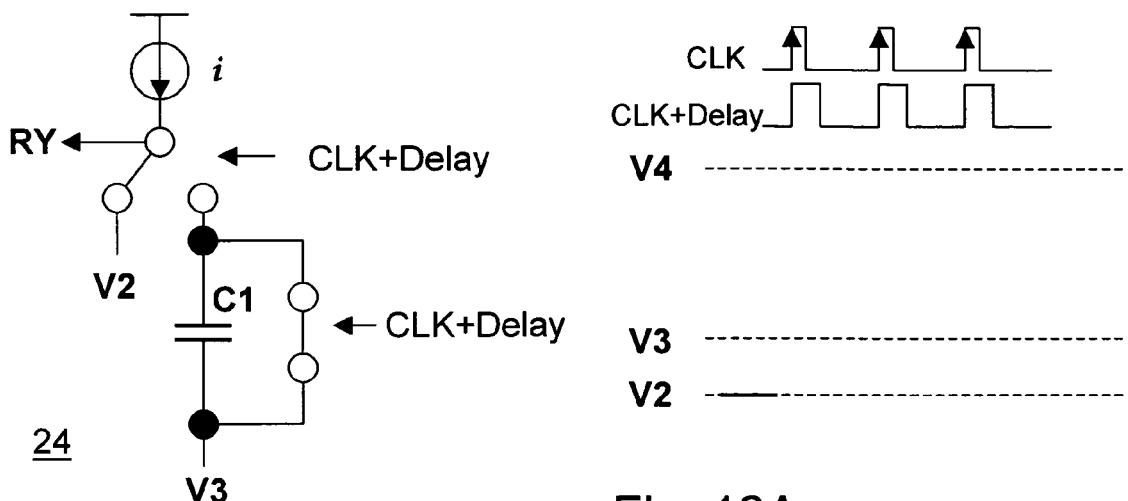
FIG. 12A to FIG. 12C show an embodiment of the waveform RY generator 24.
Figure 12B:
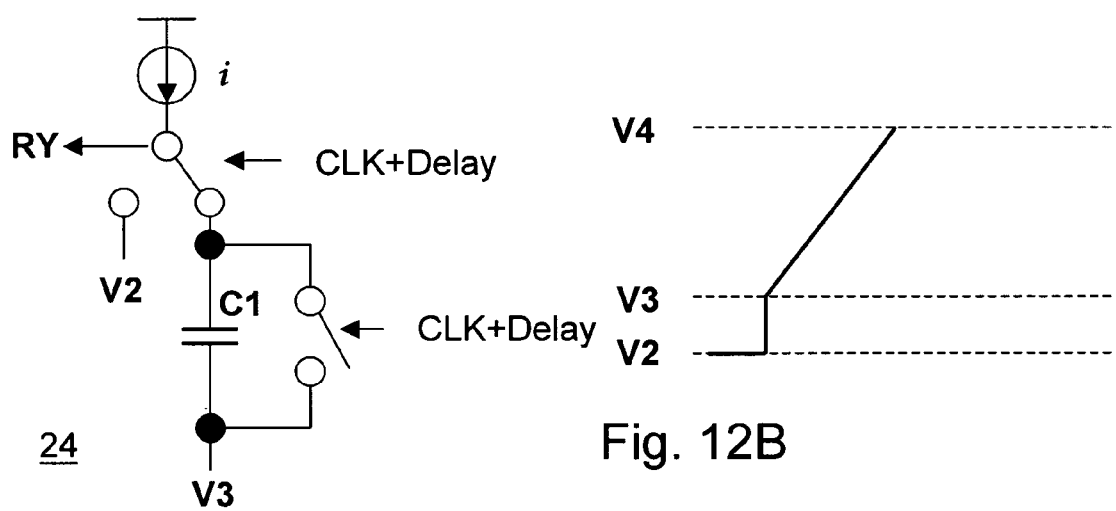
Figure 12C:
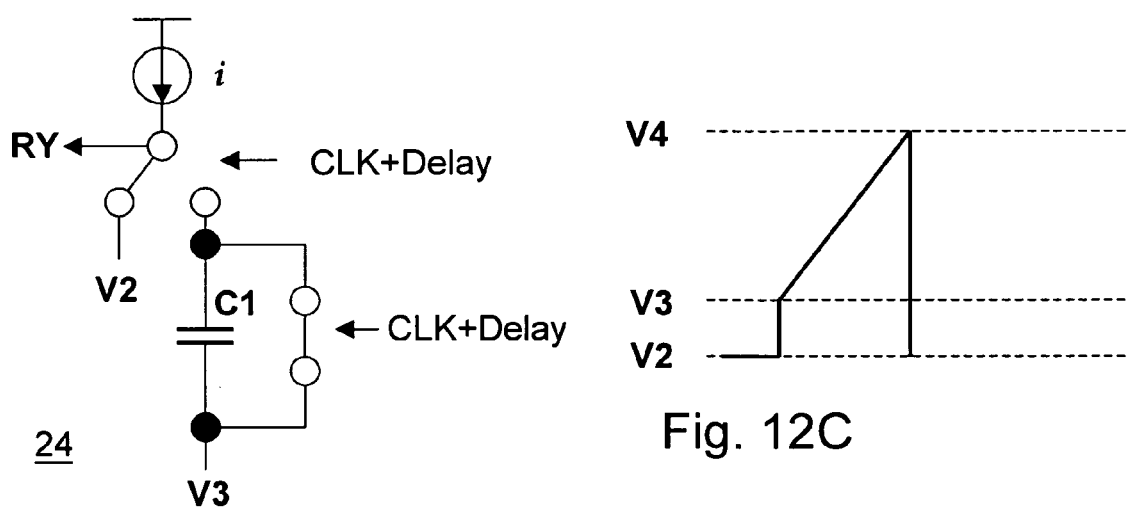

Similarly, FIG. 12A to FIG. 12C show one embodiment of the waveform RY generator 24. The cycle of the waveform RX is determined by the clock signal CLK. The regulator generates a delay signal (CLK+Delay) according to the clock signal CLK. The rising edge of the delay signal is synchronous with the clock signal CLK, but the falling edge is delayed in comparison with the falling edge of the clock signal CLK. According to the delay signal (CLK+Delay), in the beginning of a cycle the node RY is coupled to V2 and the capacitor C1 discharges such that a first segment of the waveform is formed as shown in FIG. 12A. At the falling edge of the delay signal, the node RY switches to be coupled to the capacitor C1, and the current i charges the capacitor C1, such that a second segment of the waveform is formed as shown in FIG. 12B (the lower end of the capacitor C1 is coupled to V3). At last, at the end of the cycle, a next cycle begins, and a third segment of the waveform is formed as shown in FIG. 12C.

Figure 13A:
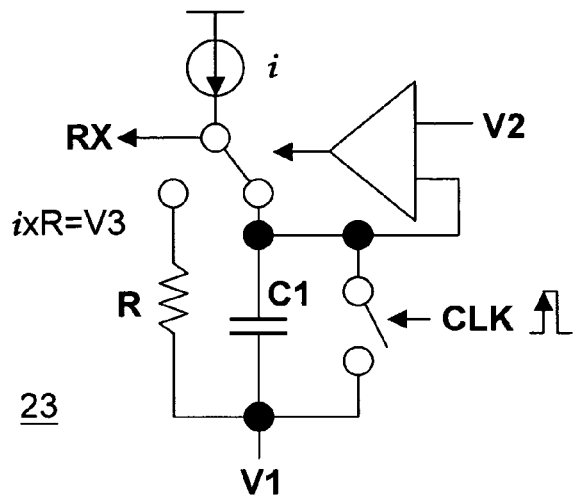
FIG. 13A to FIG. 13C show another embodiment of the waveform RX generator 23.
Figure 13A:
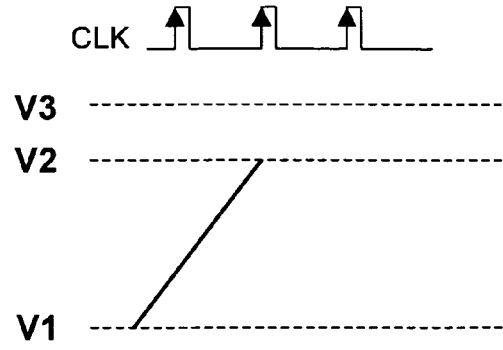
Figure 13B:
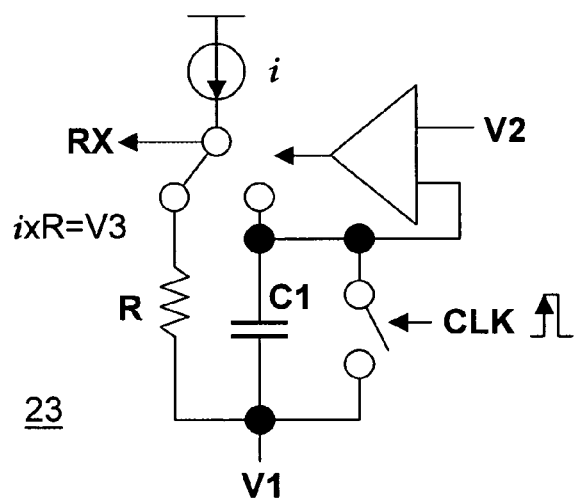
Figure 13B:
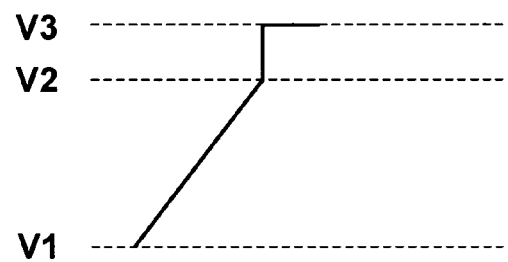
Figure 13C:
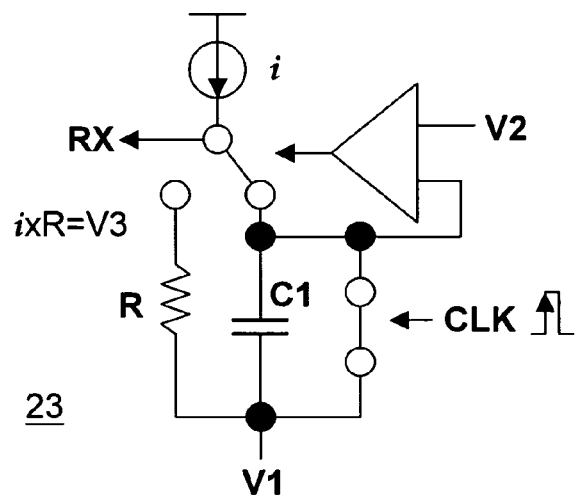
Figure 13C:
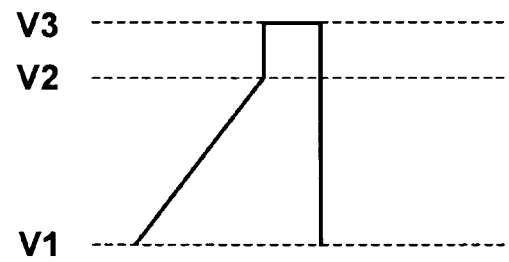

In the aforementioned embodiments of FIGS. 11A to 11C and FIGS. 12A to 12C, a delay signal is required. FIG. 13A to FIG. 13C show an embodiment which does not require the delay signal to generate the waveform RX. In the beginning of the cycle, the current i charges the capacitor C1 such that a first segment of the waveform is formed as shown in FIG. 13A. When the voltage at the upper end of the capacitor C1 reaches V2, the output of the comparator switches the node RX to voltage V3 (in this embodiment, V3 equals to ixR), such that a second segment of the waveform is formed as shown in FIG. 13B. At last, at the end of the cycle, the clock signal CLK discharges the capacitor C1 and the output of the comparator switches its state, such that a third segment of the waveform is formed as shown in FIG. 11C.

Figure 14:
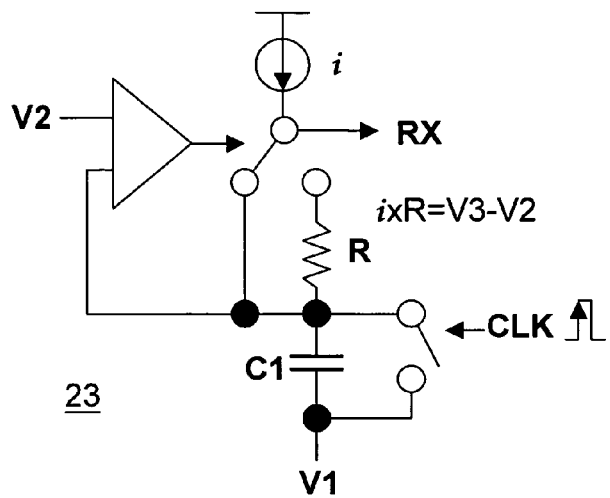
FIG. 14 shows another embodiment of the waveform RX generator 23.

FIG. 14 shows another embodiment to generate the waveform RX, wherein the resistor R is connected with the capacitor C1 in series, and iXR=V3−V2.

Figure 15:
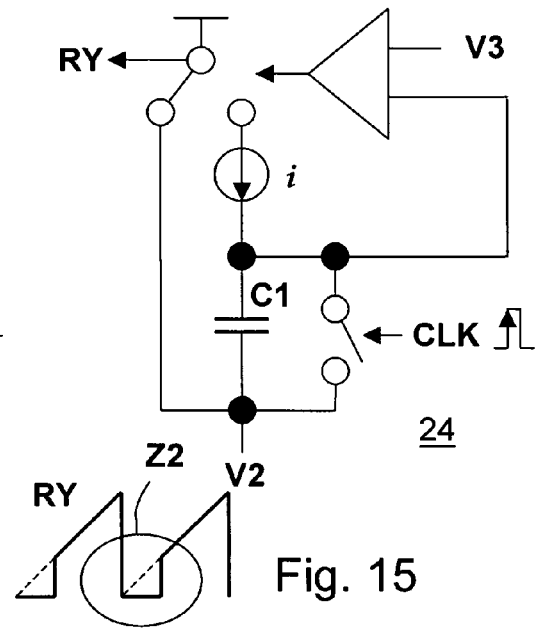
FIG. 15 to FIG. 17 show several embodiments of the waveform RY generator 24.
Figure 16:
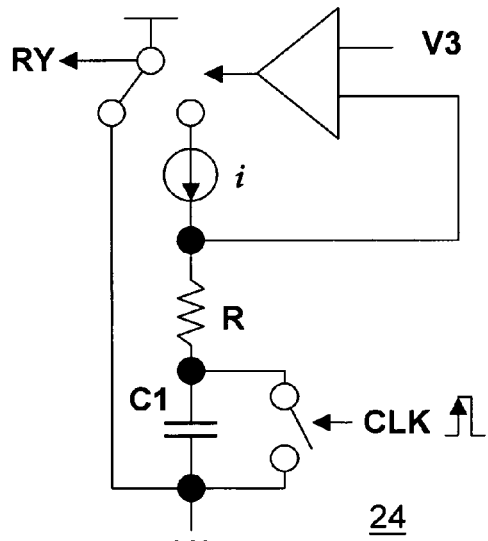
Figure 17:
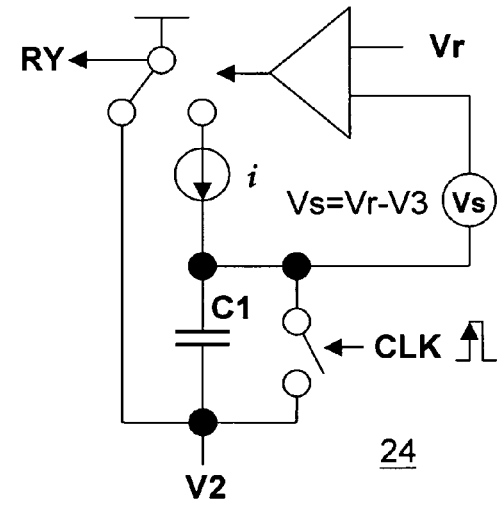

FIG. 15 to FIG. 17 show several embodiments to generate the waveform RY without using the delay signal. These embodiments use the time period that the current i charges the capacitor C1 to control the time period of the first segment of the waveform. In these embodiments, the relationships between the zone Z2 and the ramp segment of the waveforms RY are slightly different from one another. In other words, these embodiments can be applied for different settings of V2, V3, and V4. In FIG. 17, Vs is a voltage source providing a voltage of (Vr−V3), wherein Vr is an arbitrary reference voltage. Thus, when the voltage at the upper end of the capacitor C1 reaches V3, the output of the comparator changes its state, switching the connection of the node RY to the series circuit of the current source i and the capacitor C1.

Figure 18:
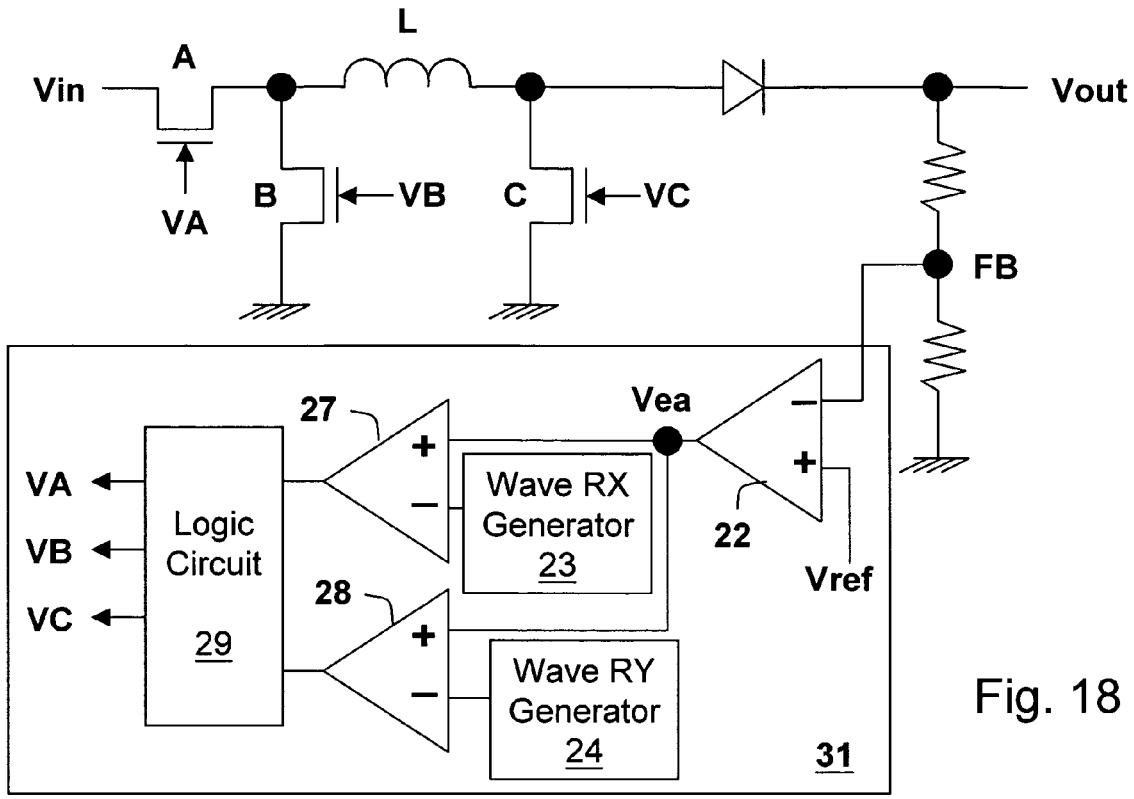
FIG. 18 and FIG. 19 show that the present invention can be applied to a semi-synchronous buck-boost switching regulator.
Figure 19:
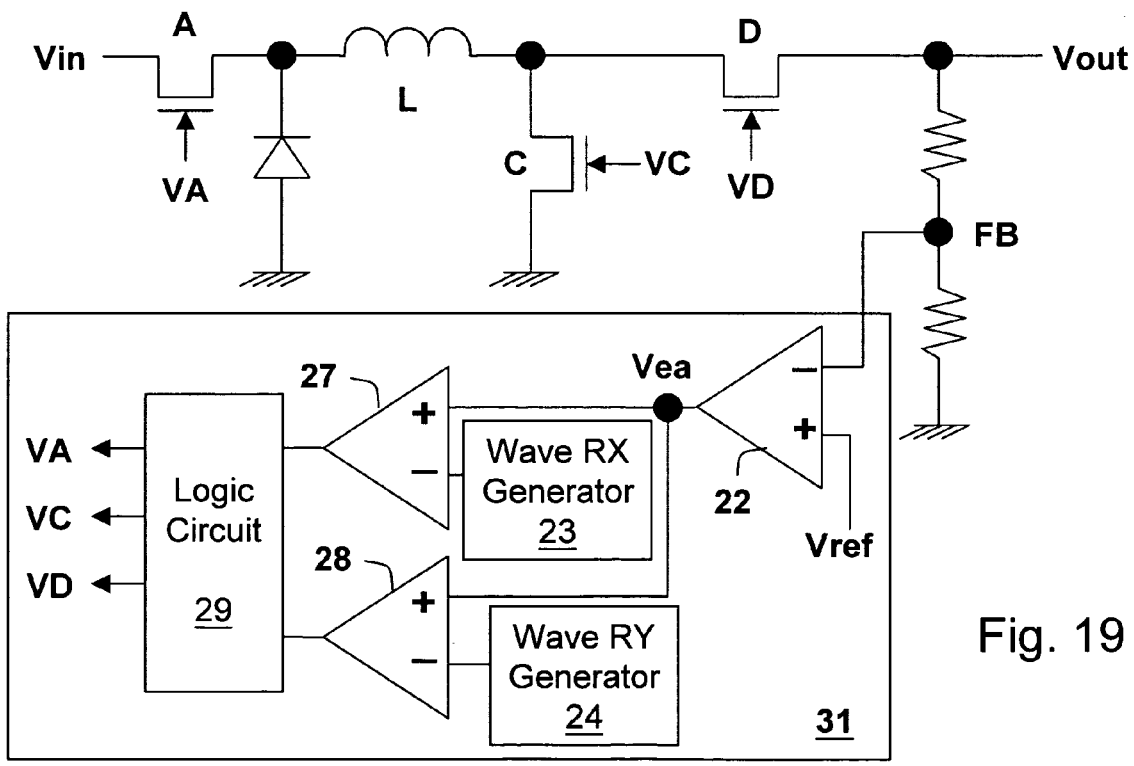

In each of the aforementioned embodiments, a synchronous buck-boost switching regulator having four power switches is illustrated for example. However, the present invention is not limited to this. As shown in FIG. 18 and FIG. 19, the present invention can be applied to the semi-synchronous buck-boost switching regulator having three power switches. The switching control signals in the buck, boost, and buck-boost conversion modes of FIG. 18 are similar to those in FIG. 8 to FIG. 10, except the switching control signal VD which is not required. The switching control signals in the buck, boost, and buck-boost conversion modes of FIG. 19 are also similar to those in FIG. 8 to FIG. 10, except the switching control signal VB which is not required.

Figure 20:
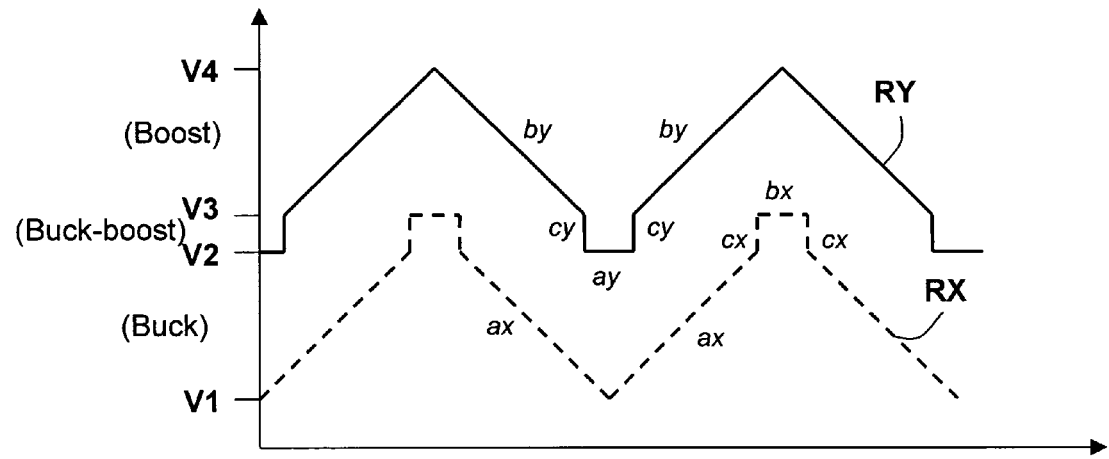
FIG. 20 to FIG. 22 show other embodiments of the waveforms RX and RY.
Figure 21:
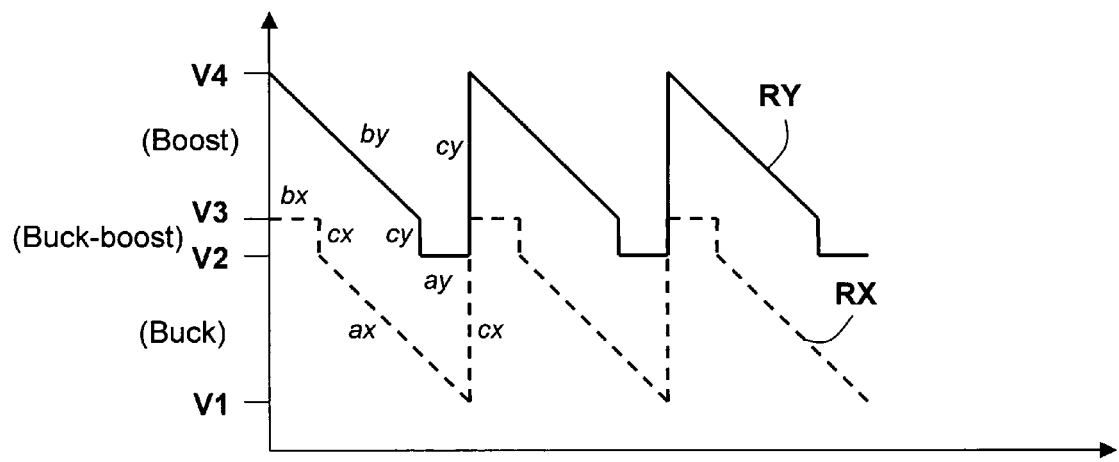
Figure 22:
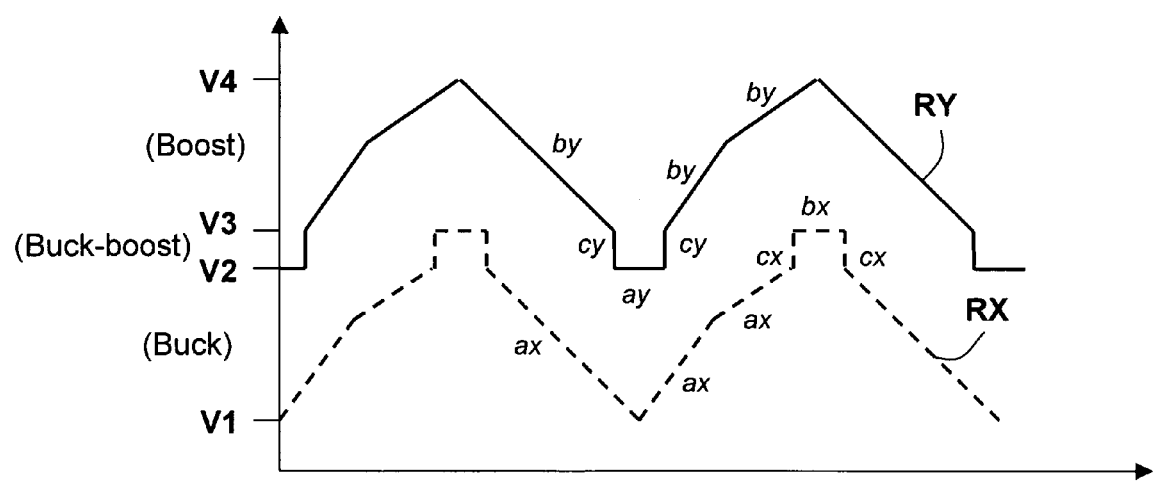

Furthermore, the waveforms RX and RY are not limited to the sawtooth waves shown in FIG. 6 to FIG. 10; the waveforms RX and RY for example can be the waveforms shown in FIG. 20 to FIG. 22, and so on. The waveforms shown in FIG. 6 to FIG. 10 and FIG. 20 to FIG. 22 have the common features below: that the waveform RX at least includes, in one cycle: a ramp segment ax between V1 and V2, a flat segment bx kept at V3 for a period of time, and two vertical segments cx at two ends of the flat segment bx; and that the waveform RY at least includes, in one cycle: a flat segment ay kept at V2 for a period of time, a ramp segment by between V3 and V4, and two vertical segments cy at the two ends of the flat segment ay.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the power switches can be NMOSFETs or PMOSFETs, with corresponding changes to the phases of the switching control signals VA, VB, VC and VD. For another example, other segments can be added in the waveform RX besides the segments ax, bx, and cx; and other segments can be added in the waveform RY besides the segments ay, by, and cy. In view of the foregoing, the spirit of the present invention should cover all such and other modifications and variations, which should be interpreted to fall within the scope of the following claims and their equivalents.

What is claimed is:

1. A buck-boost switching regulator comprising:
    an inductor having a first terminal and a second terminal; a first power switch having one terminal coupled to the first terminal of the inductor and another terminal coupled to an input voltage;
    a second power switch having one terminal coupled to the first terminal of the inductor and another terminal coupled to ground;
    a third power switch having one terminal coupled to the second terminal of the inductor and another terminal coupled to ground;
    a fourth power switch having one terminal coupled to the second terminal of the inductor and another terminal coupled to an output voltage; and
    a control circuit controlling the operation of the four power switches such that:
    when the switching regulator is operating in a buck conversion mode, the first and the second power switches operate and the third and the fourth power switches do not operate;
    when the switching regulator is operating in a boost conversion mode, the third and the fourth power switches operate and the first and the second power switches do not operate; and
    when the switching regulator is operating in a buck-boost conversion mode, the first and the second power switches operate according to a predetermined first pulse width and the third and the fourth power switches operate according to a predetermined second pulse width.

2. The switching regulator of claim 1, wherein the control circuit includes:
    an error amplifier for comparing a feedback signal relating to the output voltage with a reference voltage;
    a first wave generator for generating a first wave, which at least includes, in one cycle: a ramp segment between a first voltage (V1) and a second voltage (V2), a flat segment kept at a third voltage (V3) for a period of time, and two vertical segments at two ends of the flat segment;
    a second wave generator for generating a second wave, which at least includes, in one cycle: a flat segment kept at the second voltage (V2) for a period of time, a ramp segment between the third voltage (V3) and a fourth voltage (V4), and two vertical segments at the two ends of the flat segment, wherein V1<V2<V3<V4;

a first and a second PWM comparators for comparing the output of the error amplifier with the first wave and the second wave respectively; and a logic circuit for generating a control signal according to outputs of the first and the second PWM comparators to control the first, the second, the third, and the fourth power switches.

3. The switching regulator of claim 2, wherein (V3−V2)< (V4−V3) and (V3−V2)<(V2−V1).

4. A buck-boost switching regulator comprising:
an inductor having a first terminal and a second terminal; a first power switch having one terminal coupled to the first terminal of the inductor and another terminal coupled to an input voltage;
a second power switch having one terminal coupled to the first terminal of the inductor and another terminal coupled to ground;
a third power switch having one terminal coupled to the second terminal of the inductor and another terminal coupled to ground;
a diode having one terminal coupled to the second terminal of the inductor and another terminal coupled to an output voltage; and
a control circuit controlling the operation of the three power switches such that:
when the switching regulator is operating in the buck conversion mode, the first and the second power switches operate and the third power switch does not operate;
when the switching regulator is operating in the boost conversion mode, the third power switch operates and the first and the second power switches do not operate; and
when the switching regulator is operating in the buck-boost conversion mode, the first and the second power switches operate according to a predetermined first pulse width and the third power switch operates according to a predetermined second pulse width.

5. The switching regulator of claim 4, wherein the control circuit includes:
an error amplifier for comparing a feedback signal relating to the output voltage with a reference voltage;
a first wave generator for generating a first wave, which at least includes, in one cycle: a ramp segment between a first voltage (V1) and a second voltage (V2), a flat segment kept at a third voltage (V3) for a period of time, and two vertical segments at two ends of the flat segment;
a second wave generator for generating a second wave, which comprises in one cycle at least: a flat segment kept at the second voltage (V2) for a period of time, a ramp segment between the third voltage (V3) and a fourth voltage (V4), and two vertical segments at the two ends of the flat segment, wherein V1<V2<V3<V4;
a first and a second PWM comparators for comparing the output of the error amplifier with the first wave and the second wave respectively; and
a logic circuit for generating a control signal according to outputs of the first and the second PWM comparators to control the first, the second, and the third power switches.

6. The switching regulator of claim 5, wherein (V3−V2)< (V4−V3) and (V3−V2)<(V2−V1).

7. A buck-boost switching regulator comprising:
an inductor having a first terminal and a second terminal; a first power switch having one terminal coupled to the first terminal of the inductor and another terminal coupled to an input voltage;
a diode having one terminal coupled to the first terminal of the inductor and another terminal coupled to ground;
a second power switch having one terminal coupled to the second terminal of the inductor and another terminal coupled to ground;
a third power switch having one terminal coupled to the second terminal of the inductor and another terminal coupled to an output voltage; and
a control circuit controlling the operation of the three power switches such that:
when the switching regulator is operating in the buck conversion mode, the first power switch operates and the second and the third power switches do not operate;
when the switching regulator is operating in the boost conversion mode, the second and the third power switches operate and the first power switch does not operate; and
when the switching regulator is operating in the buck-boost conversion mode, the first power switch operates according to a predetermined first pulse width and the second and the third power switches operate according to a predetermined second pulse width.

8. The switching regulator of claim 7, wherein the control circuit includes:
an error amplifier for comparing a feedback signal relating to the output voltage with a reference voltage;
a first wave generator for generating a first wave, which at least includes, in one cycle: a ramp segment between a first voltage (V1) and a second voltage (V2), a flat segment kept at a third voltage (V3) for a period of time, and two vertical segments at two ends of the flat segment;
a second wave generator for generating a second wave, which at least includes, in one cycle: a flat segment kept at the second voltage (V2) for a period of time, a ramp segment between the third voltage (V3) and a fourth voltage (V4), and two vertical segments at the two ends of the flat segment, wherein V1<V2<V3<V4;
a first and a second PWM comparators for comparing the output of the error amplifier with the first wave and the second wave respectively; and
a logic circuit for generating a control signal according to outputs of the first and the second PWM comparators to control the first, the second, and the third power switches.

9. The switching regulator of claim 8, wherein (V3−V2)< (V4−V3) and (V3−V2)<(V2−V1).

10. A control circuit for controlling a buck-boost switching regulator to convert an input voltage to an output voltage, the control circuit comprising:
an error amplifier for comparing a feedback signal relating to the output voltage with a reference voltage;
a first wave generator for generating a first wave, which at least includes, in one cycle: a ramp segment between a first voltage (V1) and a second voltage (V2), a flat segment kept at a third voltage (V3) for a period of time, and two vertical segments at the two ends of the flat segment;
a second wave generator for generating a second wave, which at least includes, in one cycle: a flat segment kept at the second voltage (V2) for a period of time, a ramp segment between the third voltage (V3) and a fourth voltage (V4), and two vertical segments at the two ends of the flat segment, wherein V1<V2<V3<V4;
a first and a second PWM comparators for comparing the output of the error amplifier with the first wave and the second wave respectively; and a logic circuit for generating a control signal according to outputs of the first and the second PWM comparators to control the first, the second, and the third power switches.

11. The control circuit of claim 10, wherein the buck-boost switching regulator includes four power switches and the logic circuit generates four control signals to control the four power switches respectively.

12. The control circuit of claim 10, wherein the buck-boost switching regulator includes three power switches and the logic circuit generates three control signals to control the three power switches respectively.

13. The control circuit of claim 10, wherein (V3−V2)< (V4−V3) and (V3−V2)<(V2−V1).

14. A control method for controlling a buck-boost switching regulator, wherein the switching regulator includes three power switches and a diode, or four power switches, and it converts an input voltage to an output voltage by switching operations of the power switches, the control method comprising:
   obtaining a feedback signal relating to an output voltage;
   comparing the feedback signal with a reference voltage to generate an error amplified signal;
   when the error amplified signal is between a first voltage (V1) and a second voltage (V2), causing the buck-boost switching regulator to operate in a buck conversion mode;
   when the error amplified signal is between a third voltage (V3) and a fourth voltage (V4), causing the buck-boost switching regulator to operate in a boost conversion mode; and
   when the error amplified signal is between the second voltage and the third voltage, causing the buck-boost switching regulator to operate in a buck-boost conversion mode in which each power switch operates according to a respective predetermined pulse width, wherein V1<V2<V3<V4.

15. The control method of claim 14, wherein (V3−V2)< (V4−V3) and (V3−V2)<(V2−V1).

16. The control method of claim 14 further comprising:
   generating a first wave, which at least includes, in one cycle: a ramp segment between a first voltage (V1) and a second voltage (V2), a flat segment kept at a third voltage (V3) for a period of time, and two vertical segments at two ends of the flat segment;
   generating a second wave, which at least includes, in one cycle: a flat segment kept at the second voltage (V2) for a period of time, a ramp segment between the third voltage (V3) and a fourth voltage (V4), and two vertical segments at the two ends of the flat segment, wherein V1<V2<V3<V4; and
   comparing the error amplified signal with the first wave and the second wave respectively.

* * * * *